May 3, 1932. J. N. SMITH 1,856,663
ELECTRODE FOR ELECTROLYTIC APPARATUS
Filed Aug. 21, 1928   2 Sheets-Sheet 1

James N. Smith,
Inventor,
By Lewis J. Doolittle
Atty.

May 3, 1932.  J. N. SMITH  1,856,663

ELECTRODE FOR ELECTROLYTIC APPARATUS

Filed Aug. 21. 1928   2 Sheets-Sheet 2

James N. Smith,
Inventor,
By Lewis J. Doolittle,
atty.

Patented May 3, 1932

1,856,663

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

ELECTRODE FOR ELECTROLYTIC APPARATUS

Application filed August 21, 1928. Serial No. 301,147.

This invention relates to electrodes for use in electrolytic cells, more particularly cells for use in the electrolysis of water.

One object of this invention is to provide an electrode of novel construction, providing an increased electrolyzing area and which conducts or directs the generated gases away from the electrolyzing area and into vertical passages to the top of the cell.

Other objects and features will appear from the illustrative embodiment of the invention shown in the accompanying drawings, in which an electrode is shown and hereinafter described to illustrate the same.

Figure 1:
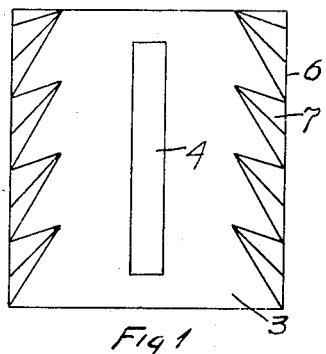
Fig. 1 is an elevation of one of the electrolyzing elements used to make up the electrode structure.
Figure 4:
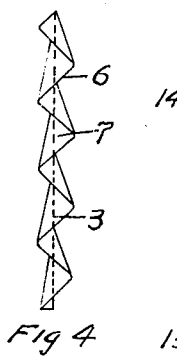
Fig. 4 is a side view showing the corrugated edge of said element.

The electrode here shown as illustrative of my invention, comprises a conducting stud of rectangular (1) or circular cross-section (2) carrying a plurality of electrolyzing elements 3, the elements being perforated with a rectangular (4) or circular perforation (5) so as to permit the stud of corresponding cross-section to pass therethrough.

Figure 2:
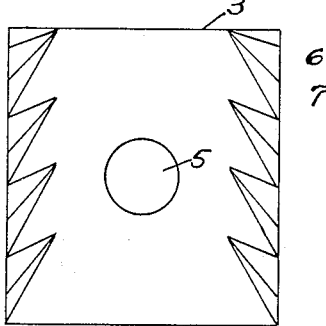
Fig. 2 is a slightly modified form of such element.
Figure 7:
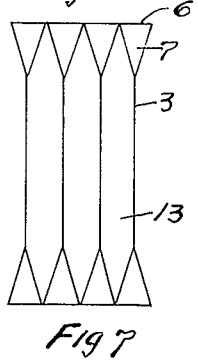
Fig. 7 is an end view of Fig. 5.
Figure 16:
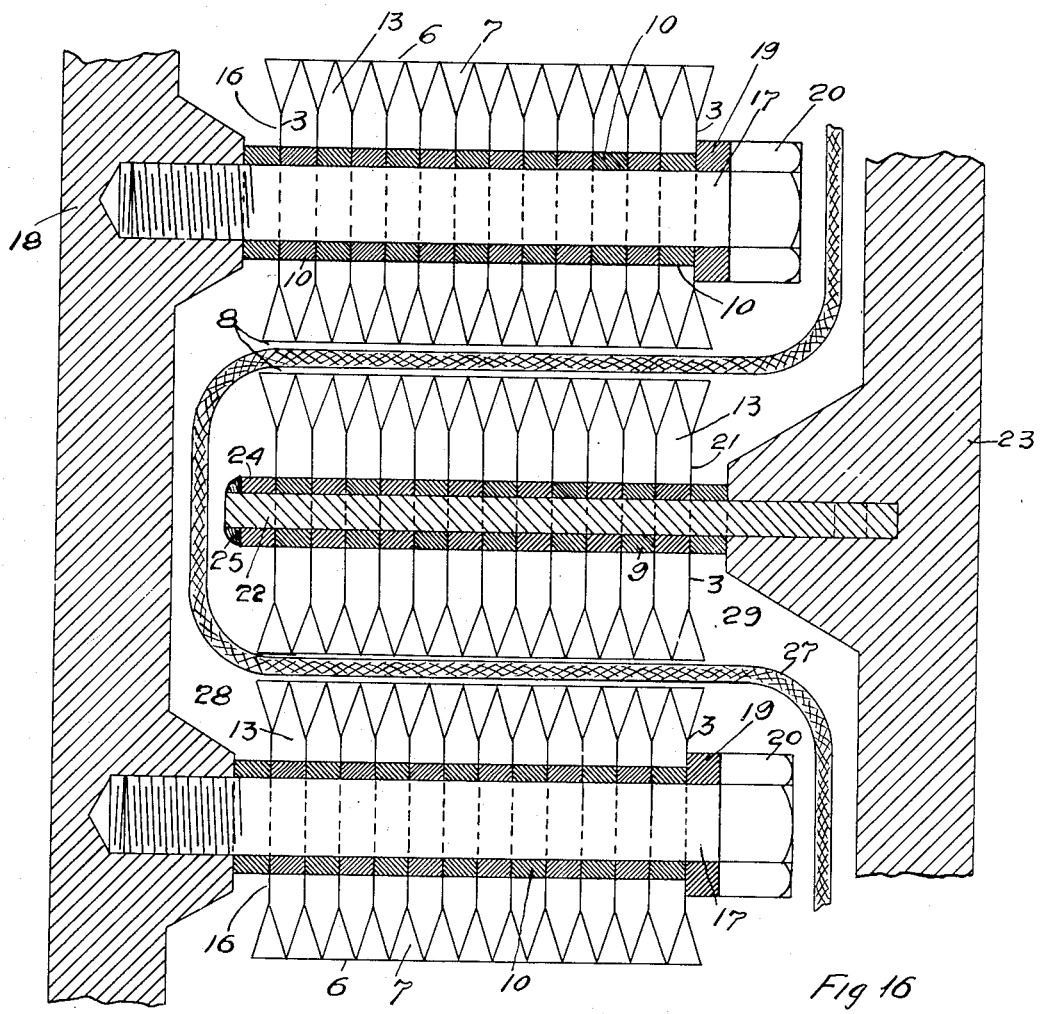
Fig. 16 is a fragmental horizontal cross-section of an electrolytic cell showing the disposition and method of attaching the electrodes of my invention to an electrolytic cell.

The elements 3 are preferably of sheet metal, the central portion being flat, presenting plane surfaces on either side thereof, and, in addition to having the perforations 4—5 (Figs. 1—2), are provided, along their electrolyzing edges 6 with upwardly pointed angular corrugations or flutings 7 to increase the active surface area, and, when assembled, facilitate the movement of gas-electrolyte away from the electrolyzing area (8) (Fig. 16).

The elements 3 are preferable decreased in thickness from the flat central portion towards and at the edges 6 to provide for the increased surface area of the corrugations which increase the electrolyzing surface at this point.

Figures 10, 11:
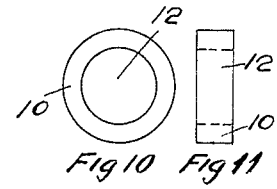
Figs. 10 and 11 are front and side views, respectively, of a circular spacer used in conjunction with the element shown in Fig. 2.
Figures 8, 9:
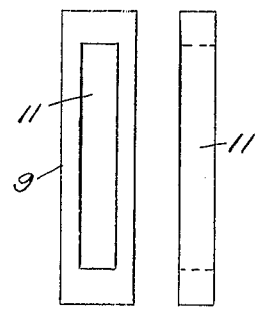
Figs. 8 and 9 are, respectively, front and side views of an oblong spacer used in conjunction with the form of element shown in Fig. 1.
Figure 12:
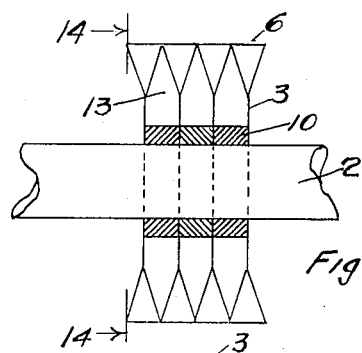
Fig. 12 is a top view, partly in section, of an assembly of elements (Fig. 2) and spacers (Fig. 10) on a round conducting stud.
Figure 13:
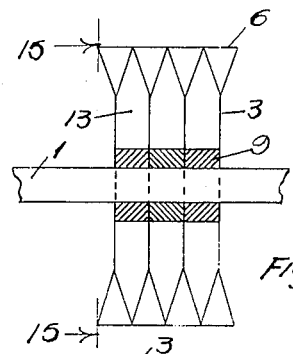
Fig. 13 is a view similar to Fig. 12, of an assembly of elements (Fig. 1) and spacers (Fig. 8) on a conducting stud of rectangular cross-section.
Figure 14:
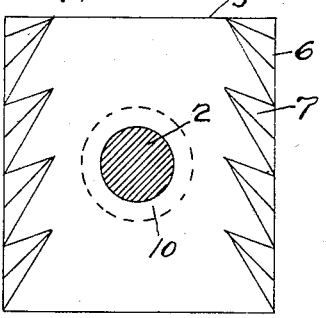
Fig. 14 is an elevation, partly in section, on the line 14—14 of Fig. 12.
Figure 15:
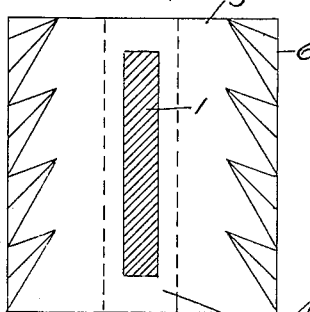
Fig. 15 is an elevation, partly in section, on the line 15—15 of Fig. 13.

Rectangular (9) or round spacers (10) having perforations 11—12, respectively (Figs. 8—10) adapted to be carried on the conducting studs 1 or 2 (Figs. 12—13), as the case may be, are disposed between adjacent elements 3, which, when assembled and mounted in the cell (Fig. 16), provide vertical central passages 13 therebetween.

Figure 5:
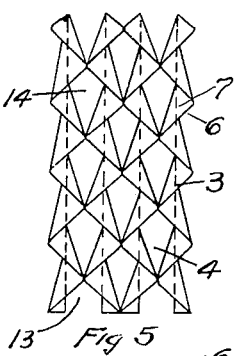
Fig. 5 is a view similar to Fig. 4 showing an assembly of said electrodes forming honeycomb passages therebetween.
Figure 6:
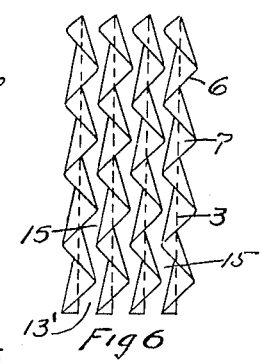
Fig. 6 is a view similar to Fig. 5 showing another arrangement of the elements to form serpentine side passages.
Figure 3:
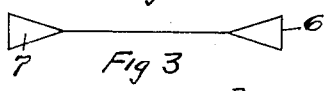
Fig. 3 is an end view of said element.

The elements 3 are so formed and arranged on the stud (1 or 2) that passages are also provided along the electrolyzing edges which communicate with the vertical central passages 13. This arrangement may take one or more forms. The elements may be placed with the angular corrugations 7 extending in opposite directions in adjacent elements 3, as shown in Fig. 5, so as to provide honeycomb passages 14 extending inwardly and upwardly to the vertical passages 13; or they may be placed with the corrugations parallel, as shown in Fig. 6, so as to provide inwardly and upwardly inclined passages 15 which communicate with the vertical passages 13'.

As shown in Fig. 16, the electrode, indicated generally by 16, comprises a bolt 17 which threads into the end plate 18 of the cell. Mounted on said bolt are the elements 3 and spacers 10. A somewhat larger spacer 19 is placed between the head 20 of the bolt and the element adjacent it.

Another form of mounting for the electrode, indicated generally by 21 (Fig. 16) comprises a rectangular stud 22 which is cast in or welded on to the end plate 23. On said stud are mounted the usual elements 3 and spacers 9, but the end washer 24 and the assembly of elements 3 and spacers 9 are held in position and alinement on the stud 22 by a collar 25 welded or otherwise secured to the end of said stud.

The two forms of electrodes as shown in Fig. 16 are similar and only differ in the form of mounting on the end plates.

Interposed between the electrodes 16—21 is a liquid pervious diaphragm 27, which takes a sinusoidal course and divides the cell into anode and cathode chambers 28—29, as the case may be.

Figure 17:
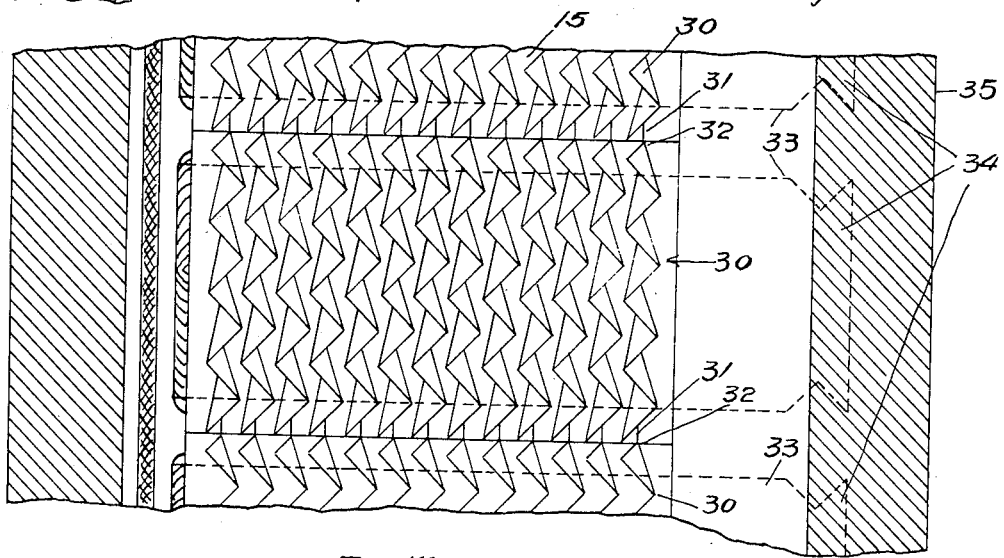
Fig. 17 is a fragmental vertical cross-section of an electrolytic cell showing superposed electrode elements of like polarity electrically connected together to form a multiple electrode.

Fig. 17 shows another method of mounting the electrode elements, which consists in superposing a plurality of electrodes 30, each comprising an assembly of elements 3, mounted as shown in Fig. 6, so that the uncorrugated bottom edge 31 of one alines with the upper uncorrugated edge 32 of an electrode below it, thus forming a combined electrode of increased size.

The studs 33 of the electrodes 30 (Fig. 17) have a dovetail-shaped end 34 which may be cast into or otherwise secured to the end plate 35 of the cell.

Having described my invention, what I claim is:

1. An electrode comprising a plurality of superimposed electrolyzing elements assembled and carried on a conducting stud extending transversely therethrough, said elements being formed with a flat central portion and corrugated edge portions which when assembled form a plurality of central vertical passages and side passages communicating therewith extending inwardly from the edges of said electrode.

2. An electrode having a plurality of vertical central passages and side passages communicating therewith, extending inwardly from the edges of said electrode, formed by juxtaposed, parallelly disposed electrolyzing elements assembled and carried on a conducting stud extending transversely therethrough, said elements being formed with a flat central portion and corrugated edge portions which when assembled form said passages.

3. An electrode having a plurality of vertical central passages and side passages communicating therewith, extending inwardly from the edges of said electrode, formed by juxtaposed, parallelly disposed electrolyzing elements, said elements being formed with a flat central portion and corrugated edge portions which form said passages when alined and supported on a conducting stud extending through said elements.

4. An electrode having a plurality of vertical central passages and upwardly inclined side passages communicating therewith, extending inwardly from the edges of said electrode, formed by juxtaposed, parallelly disposed electrolyzing elements having flat central portions and corrugated along their electrolyzing edges.

5. An electrode having a plurality of vertical central passages and upwardly inclined side passages communicating therewith, extending inwardly from the edges of said electrode, formed by juxtaposed, parallelly disposed electrolyzing elements having flat central portions and corrugated along their electrolyzing edges and alined and supported on a conducting stud extending through the flat central portion of said elements.

6. An electrode having a plurality of vertical central passages and upwardly inclined side passages communicating therewith, extending inwardly from the edges of said electrode, formed by spaced-apart adjacent electrolyzing elements having flat central portions and corrugated along their electrolyzing edges and alined and supported on a conducting stud extending through the flat central portion of said elements.

7. An electrode comprising a conducting stud, a plurality of vertically alined, medially perforated and edge-corrugated electrolyzing elements, and spacers disposed between and separating said elements, forming inwardly extending passages from the edges of said elements and communicating with vertical passages between said elements, said stud passing through said elements and spacers.

8. The combination with an electrolytic cell, of electrodes, each comprising a horizontal conducting stud carrying a plurality of spaced vertically positioned electrolyzing elements forming inwardly extending passages from the edges of and communicating with vertical passages between said elements.

9. The combination with an electrolytic cell, of electrodes, each comprising a horizontal conducting stud carrying a plurality of spaced vertically positioned electrolyzing elements having upwardly inclined corrugations along their electrolyzing sides forming inwardly extending passages communicating with vertical passages between adjacent elements.

10. The combination with an electrolytic cell, of electrodes, comprising a horizontal conducting stud carrying a plurality of vertical electrolyzing elements, having upwardly inclined edge-corrugations, and spacers disposed between said elements.

11. An electrode comprising a plurality of superimposed electrolyzing elements assembled and carried on a conducting stud extending transversely therethrough, said elements being formed with flat central portion and corrugated edge portions which when assembled form a plurality of vertical central passages and side passages communicating therewith, said passages being adapted to conduct gas-electrolyte inwardly and away from the electrolyzing area and up through the vertical passages.

12. The combination with an electrolytic cell, of electrodes, each comprising a horizontal conducting stud carrying a plurality of spaced vertically positioned electrolyzing elements having flat central portions and upwardly inclined corrugations along their electrolyzing sides forming inwardly extending passages communicating with vertical passages between adjacent elements, the electrodes being mounted alternately on opposite walls of the cell with the corrugated edges of each electrode adjacent opposed sides of electrodes of opposite polarity, and a pervious diaphragm extending around said electrodes in a sinusoidal course between said adjacent sides of alternate electrodes and around the ends thereof near the walls of said cell, the opposite walls of said cell and the alternate electrodes being of opposite polarity.

Signed at Toronto, Province of Ontario, in the county of York and Dominion of Canada, this 16th day of August, A. D. 1928.

JAMES NORMAN SMITH.